(No Model.) 2 Sheets—Sheet 1.
W. B. CARPENTER.
MUD GUARD FOR BICYCLES.
No. 598,312. Patented Feb. 1, 1898.
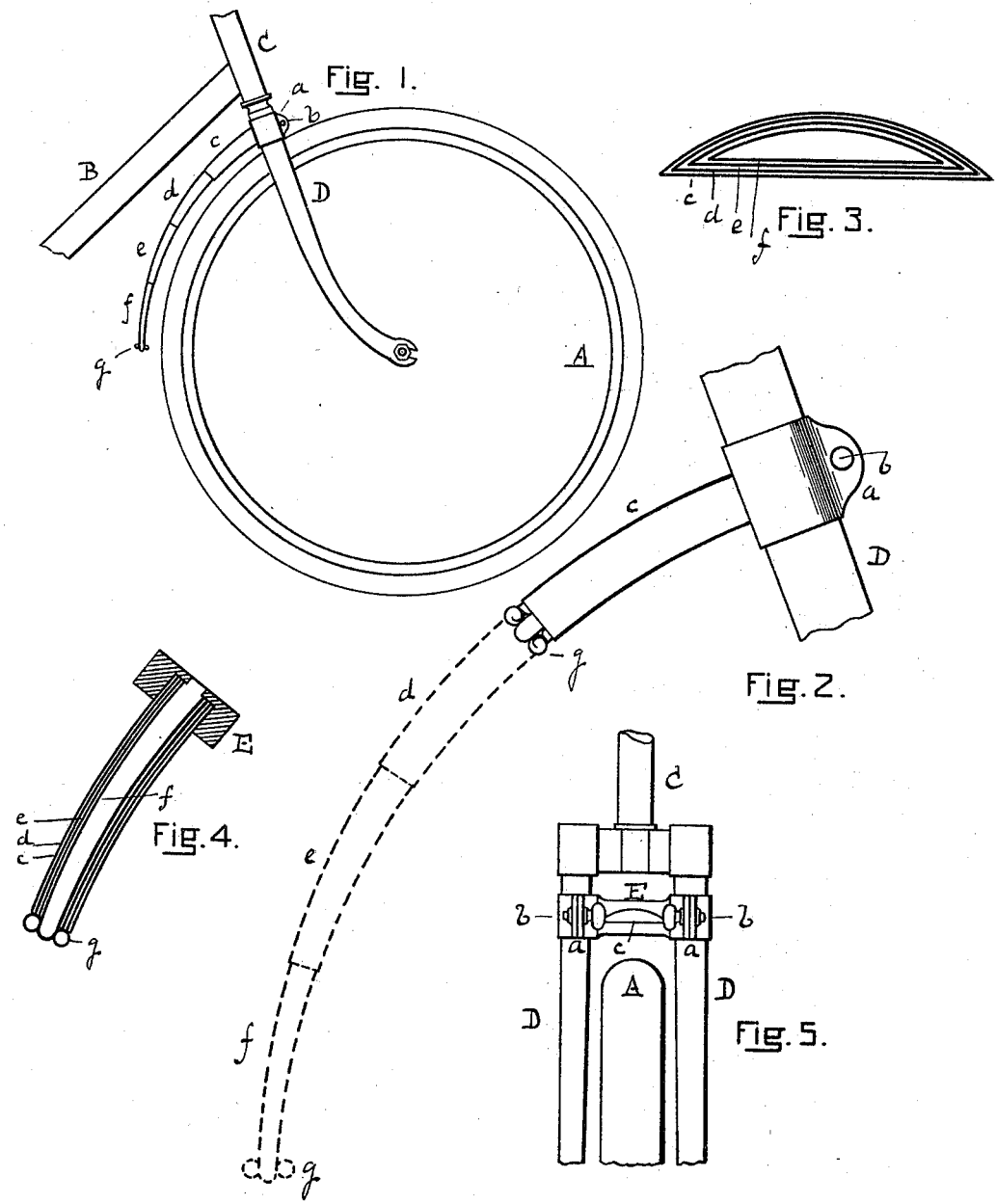

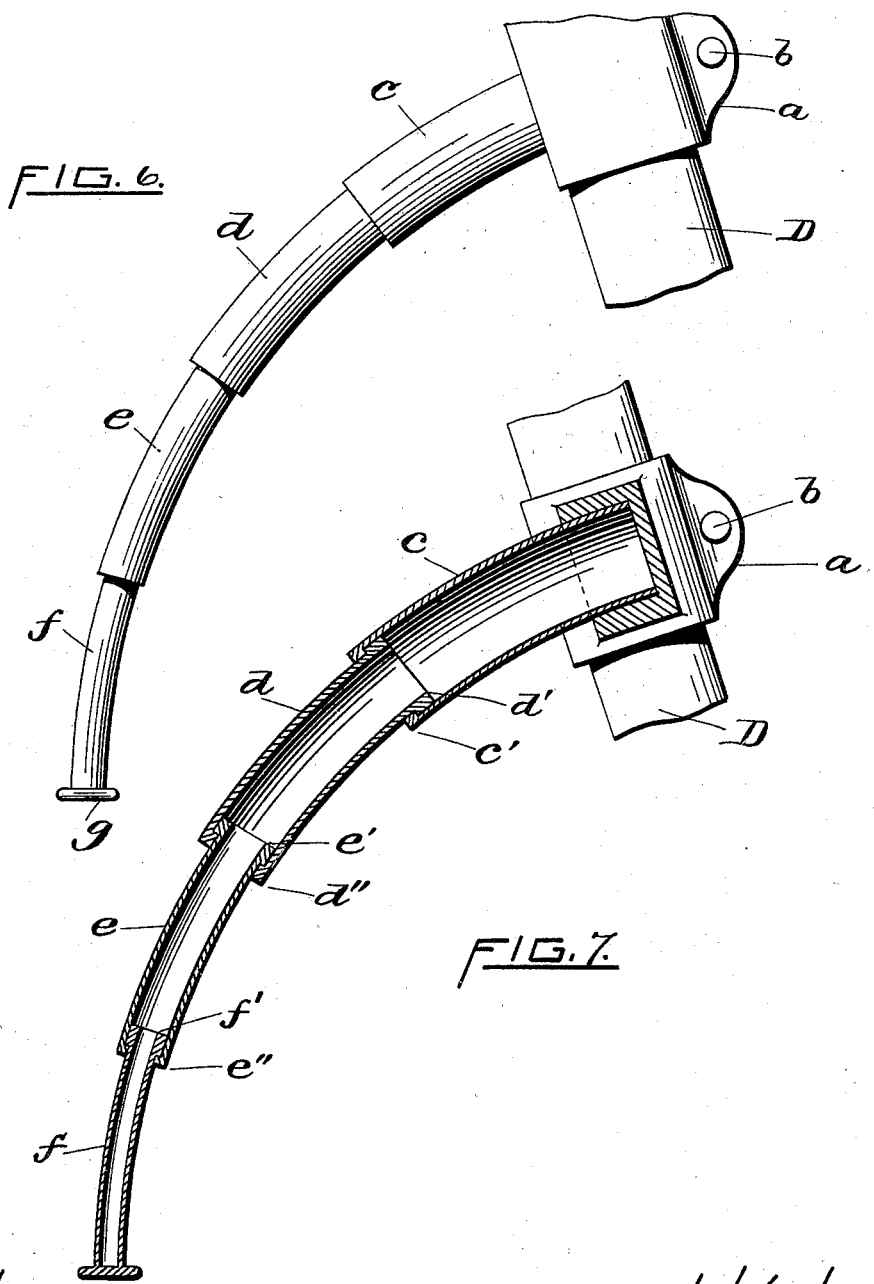

UNITED STATES PATENT OFFICE.

WILLIAM B. CARPENTER, OF PROVIDENCE, RHODE ISLAND.

MUD-GUARD FOR BICYCLES.

SPECIFICATION forming part of Letters Patent No. 598,312, dated February 1, 1898.

Application filed April 20, 1897. Serial No. 633,028. (No model.)

*To all whom it may concern:*

Be it known that I, WILLIAM B. CARPENTER, of the city and county of Providence, in the State of Rhode Island, have invented a certain new and useful Improvement in Mud-Guards for Bicycles; and I declare the following to be a specification thereof, reference being had to the accompanying drawings.

Like letters indicate like parts.

Figure 1 is a side elevation of my invention and the parts of a bicycle to which it appertains. Fig. 2 is a side elevation of my invention on an enlarged scale, the solid lines of the mud-guard showing it in its closed position and the dotted lines in its extended position. Fig. 3 is an end view of the same showing the sections closed together. Fig. 4 is a longitudinal section of the same, showing the telescoping of the parts together when closed. Fig. 5 is a rear elevation of a part of the steering-head and forks and wheel, with the cross-bar and clamps to support the mud-guard between the forks. Fig. 6 is an enlarged view, in side elevation, of my improved guard when extended. Fig. 7 is a longitudinal central section of the parts shown in Fig. 6.

My invention relates to the mud-guards used upon bicycles to protect the rider from the mud and dirt thrown by the centrifugal force of the wheel when in motion.

It consists of slightly-curved hollow sections of sheet metal, of proper shape and of various diameters, which are mounted telescopically in and upon each other, respectively, in a consecutive series, together with suitable supports for the larger section, as hereinafter particularly described.

In the drawings, A represents the wheel, B a part of the frame, C a part of the steering-head, and D the forks, of a bicycle, all of the usual construction.

A cross-head E extends between the fork D, as shown in Fig. 5, and has clamping ends $a$, which are tightened and secured by clamping-screws $b$ around the forks D, as there illustrated.

The purpose of the cross-head E is to support the mud-guard, which is made in tubular sections $c$, $d$, $e$, and $f$, each plano-convex in cross-section, as seen in Fig. 3, section $d$ being of slightly less diameter than section $c$, $e$ less than $d$, and $f$ less than $e$. By this arrangement the sections are telescopically mounted, as shown in Figs. 3 and 4, but are capable of extension, as shown in Figs. 1 and 2. The interior section $f$ has a closed outer end and thumb-pieces $g$, by which it can be seized and the whole series of sections drawn out. The tubes or sections are slightly curved, so as to extend in a direction substantially parallel with the tire of the wheel when they are fully drawn out, as in Fig. 1, and they are provided with any suitable stops, lips, or flanges to limit the upward sliding or movement of the parts, as well known in the case of telescopically-mounted tubes.

The drawings show that the section $c$ has the internal annular shoulder or lip $c'$ at its outer end; that the section $d$ has the external annular shoulder or lip $d'$ at its inner end and the internal annular shoulder or lip $d''$ at its outer end; that the section $e$ has the external annular shoulder or lip $e'$ at its inner end and the internal annular shoulder or lip $e''$ at its outer end, and that the section $f$ has the external annular shoulder or lip $f'$ at its inner end. These shoulders or lips, as illustrated in Fig. 7, prevent the sections from being pulled apart and allow them to slide telescopically, as hereinbefore specified.

I claim as a novel and useful invention and desire to secure by Letters Patent—

The improved mud-guard for bicycles herein described, consisting of a plano-convex curved tube, properly mounted upon a bicycle-frame, in combination with a series of similarly-shaped tubular sections of less diameter mounted and movable telescopically in a consecutive series, each section having suitable stops and all supported by the tube first mentioned, substantially as specified.

WILLIAM B. CARPENTER.

Witnesses:
WM. FLETCHER,
J. A. PLUNKETT.